US012357084B2

United States Patent
Zhou et al.

(10) Patent No.: US 12,357,084 B2
(45) Date of Patent: Jul. 15, 2025

(54) LIFT MECHANISM SELF-LOCKING PUSH ROD

(71) Applicant: NINGBO SCIENCE FULL MOTOR COMPANY LIMITED, Ningbo (CN)

(72) Inventors: Yongqiang Zhou, Ningbo (CN); Baoguo Tan, Ningbo (CN)

(73) Assignee: NINGBO SCIENCE FULL MOTOR COMPANY LIMITED, Ningbo (CN)

( * ) Notice: Subject to any disclaimer, the term of this patent is extended or adjusted under 35 U.S.C. 154(b) by 67 days.

(21) Appl. No.: 18/238,857

(22) Filed: Aug. 28, 2023

(65) Prior Publication Data

US 2024/0065433 A1   Feb. 29, 2024

(30) Foreign Application Priority Data

Aug. 29, 2022 (CN) .......................... 202222311256.7

(51) Int. Cl.
  *A47B 9/20* (2006.01)
  *A47C 3/40* (2006.01)

(52) U.S. Cl.
  CPC . *A47B 9/20* (2013.01); *A47C 3/40* (2013.01)

(58) Field of Classification Search
  CPC .............. A47B 9/20; A47B 2200/0051; A47B 2200/0052; A47B 2200/0056; A47B 2200/0059; A47C 3/40; F16B 25/2454; F16D 63/008; F16M 2200/027; F16M 11/28; F16M 2200/025

USPC ............................... 248/188.5, 333, 335–338
  See application file for complete search history.

(56) References Cited

U.S. PATENT DOCUMENTS

| | | | |
|---|---|---|---|
| 2012/0068635 A1* | 3/2012 | Koch | A61G 7/005 318/135 |
| 2015/0337930 A1* | 11/2015 | Tseng | B60T 17/22 74/89.39 |
| 2016/0146317 A1* | 5/2016 | Tseng | F16C 19/545 74/89.37 |
| 2017/0211670 A1* | 7/2017 | Boch | F16H 25/2252 |
| 2022/0243793 A1* | 8/2022 | Hu | A47B 9/04 |
| 2022/0312953 A1* | 10/2022 | Zheng | A47B 9/04 |

* cited by examiner

*Primary Examiner* — Christopher Garft
(74) *Attorney, Agent, or Firm* — Juan Carlos A. Marquez; Marquez IP Law Office, PLLC

(57) ABSTRACT

A lift mechanism self-locking push rod is provided, which comprises a drive component, a transmission component, and a lift component, and a self-locking device is disposed between the drive component and the transmission component; a power input shaft of the transmission component is sleeved into a one-way bearing; a first locking piece and a second locking piece are disposed around the one-way bearing; the first locking piece is fixedly connected with the one-way bearing, and the second locking piece rotatably cooperates with the one-way bearing; the first locking piece is abutted against the second locking piece; a resistance is generated between abutting surfaces of the first locking piece and the second locking piece for the purpose of locking. The resistance between the abutting surfaces helps to achieve the locking effect while the entire structure not be rotated and the length of the lift component not be changed.

8 Claims, 4 Drawing Sheets

LIFT MECHANISM SELF-LOCKING PUSH ROD

This application is based upon and claims priority to Chinese Patent Application No. 202222311256.7, filed on Aug. 29, 2022, the entire contents of which are incorporated herein by reference.

TECHNICAL FIELD

The present disclosure relates to the field of lift mechanism push rods and in particular to a lift push rod with self-locking function.

BACKGROUND

Along with continuous improvement of living quality of people, more and more people favor more convenient and more widely applicable office and household products. For this reason, a height-adjustable lift mechanism becomes more and more popular among household and office products. A lift mechanism usually comprises a drive component, a transmission component and a lift rod. The lift mechanism is usually applied such that an end of the lift rod supports a working component with a weight such as a desktop and a chair top and thus, the working component can be adjusted in height by lifting or lowering the lift mechanism. Due to the weight of the working component, it is required to prevent the lift rod from unexpectedly falling due to the weight of the working component, so as to protect the drive component such as a motor against damage. Therefore, the lift mechanism is usually provided with a self-locking device to enable the lift rod to maintain a desired length, thus ensuring the working component stays at a desired height. To satisfy the requirement, the self-locking device of the lift mechanism must have a sufficient bearing capacity to maintain the desired length of the lift rod when the drive component is not started to ensure that no interference is brought to ascent or descent of the lift rod under the action of a drive force.

SUMMARY

In order to address the above technical problem, the present disclosure provides a lift mechanism self-locking push rod with sufficient support force.

The technical solution of the present disclosure provides a lift mechanism self-locking push rod, comprising: a drive component, a transmission component, and a lift component. A self-locking device is disposed between the drive component and the transmission component. A power input shaft of the transmission component is sleeved into a one-way bearing. A first locking piece and a second locking piece are disposed around the one-way bearing. The first locking piece is fixedly connected with the one-way bearing, and the second locking piece rotatably cooperates with the one-way bearing. The first locking piece is abutted against the second locking piece. A resistance is generated between abutting surfaces of the first locking piece and the second locking piece for the purpose of locking.

With the above structure, the drive component outputs a positive power, and the power input shaft which is rotated under the support of the one-way bearing along a free rotation direction transmits the power to the lift component, so as to change the length of the lift component. If the drive component outputs a reverse power, the one-way bearing is locked in this direction and thus, the power input shaft, the one-way bearing and the first locking piece can serve as a one-piece structure for rotation. Further, at this time, the drive component has sufficient power to overcome the resistance between the first locking piece and the second locking piece. Therefore, the length of the lift component can be changed. When the power output of the drive component is paused, the self-locking device locks the transmission component. Specifically, at this time, the lift component transmits external acting forces such as weight to the transmission component. Because the one-way bearing is locked in this direction and thus cannot rotate, the power input shaft, the one-way bearing and the first locking piece can serve as a one-piece structure. Further, the resistance between the abutting surfaces of the first locking piece and the second locking piece is sufficient to counteract the external acting forces. Thus, the entire structure will not be rotated, namely, the length of the lift component will not be changed, thus achieving the locking effect.

Furthermore, the resistance between the first locking piece and the second locking piece is one or two of a frictional force and a magnetic attraction force.

Furthermore, at least the abutting surface of the first locking piece and the second locking piece are made of a frictional material.

Furthermore, a magnetic attraction effect is present between the first locking piece and the second locking piece. Specifically, the first locking piece and the second locking piece both are made of a magnetic material, or one of the first and second locking pieces is made of a magnetic material and the other is made of a magnetically-attracted material.

Furthermore, the self-locking device is further provided with a third locking piece. The first locking piece, the second locking piece and the third locking piece are coaxially disposed and arranged sequentially along a drive force transmission direction. The first, second and third locking pieces are respectively provided with a shaft hole for the power input shaft to pass through.

Furthermore, a first step and a second step are disposed inside the third locking piece; the first step is used to dispose the second locking piece; an end of the one-way bearing is penetrated through the first locking piece and the second locking piece and then accommodated on the second step.

Furthermore, the third locking piece is fixedly connected to the second locking piece, and the third locking piece is located at an end of the transmission component for receiving the power.

Furthermore, when the speed-varying assembly is a gear speed-varying assembly, the power input shaft sequentially passes through the shaft holes of the first locking piece, the second locking piece and the third locking piece and then connects with a drive gear of the gear speed-varying assembly.

Furthermore, the first locking piece and the second locking piece both are annular structures, which are sequentially sleeved around the one-way bearing.

Furthermore, the drive component is provided with an external rotor brushless motor to provide the drive force.

Figure 1:
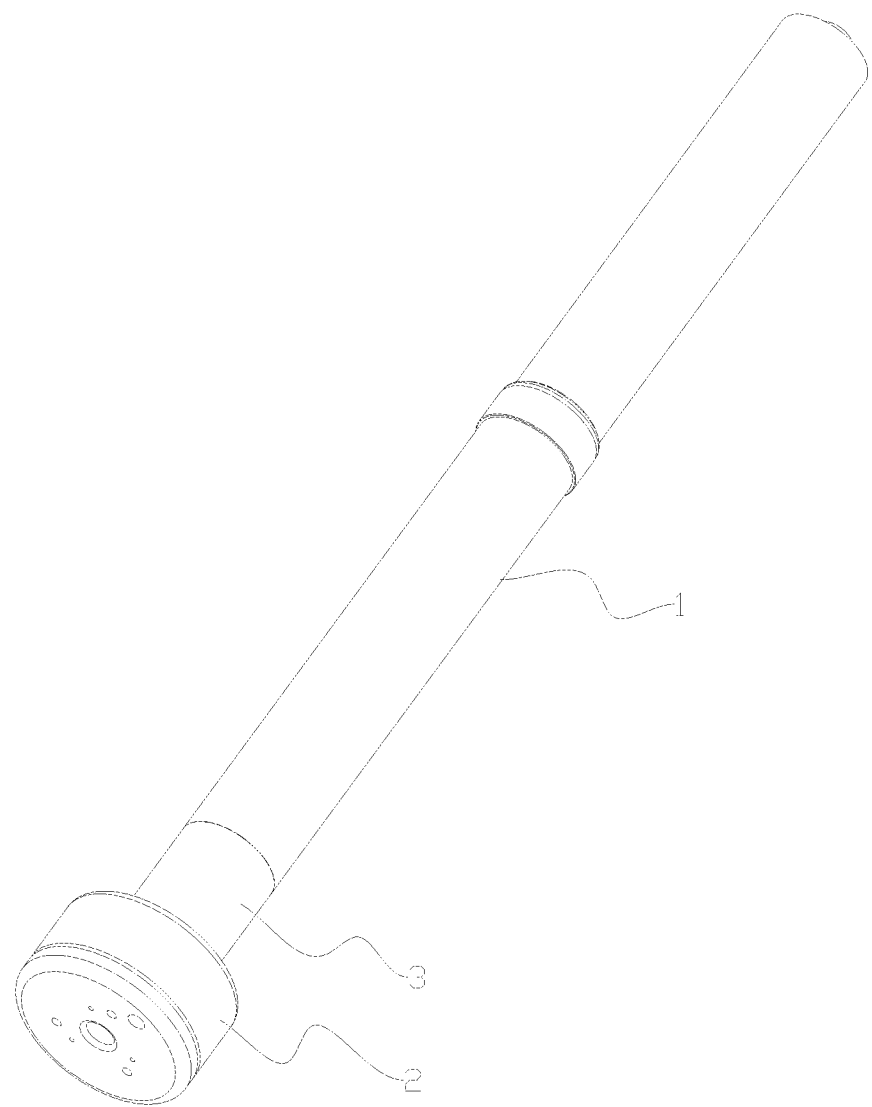
FIG. 1 is a stereoscopic structure diagram of a lift mechanism self-locking push rod of the present disclosure.

Numerals of the drawings are described below: 1. lift component, 2. drive component, 3. transmission component, 31. power input shaft, 32. one-way bearing, 33. speed varying assembly, 41. first locking piece, 42. second locking piece, 43. third locking piece, 431. first step, and 432. second step.

DETAILED DESCRIPTIONS OF EMBODIMENTS

The present invention will be further detailed below in combination with specific embodiments.

In the descriptions of the present invention, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" is used only for ease of descriptions and simplification of descriptions and does not indicate or imply that the indicated devices or elements must have a particular orientation, or be constructed or operated in a particular orientation. Therefore, such terms shall not be understood as limiting of the present invention.

Further, the terms "first" and "second" are used for descriptions only and shall not be understood as indicating or implying relative importance or implicitly indicating the number of the indicated features. As a result, the features defined by "first" and "second" may explicitly or implicitly include at least one feature. In the descriptions of the present invention, the meaning of "several" refers to at least two, for example, two or three or the like, unless otherwise clearly stated.

In the present invention, unless otherwise clearly stated or defined, the terms "mount", "connect", "couple", and "fix" and the like shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements, unless otherwise stated. Those skilled in the art may understand the specific meanings of the above terms in the present invention according to actual situations.

In the present invention, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

Figure 2:
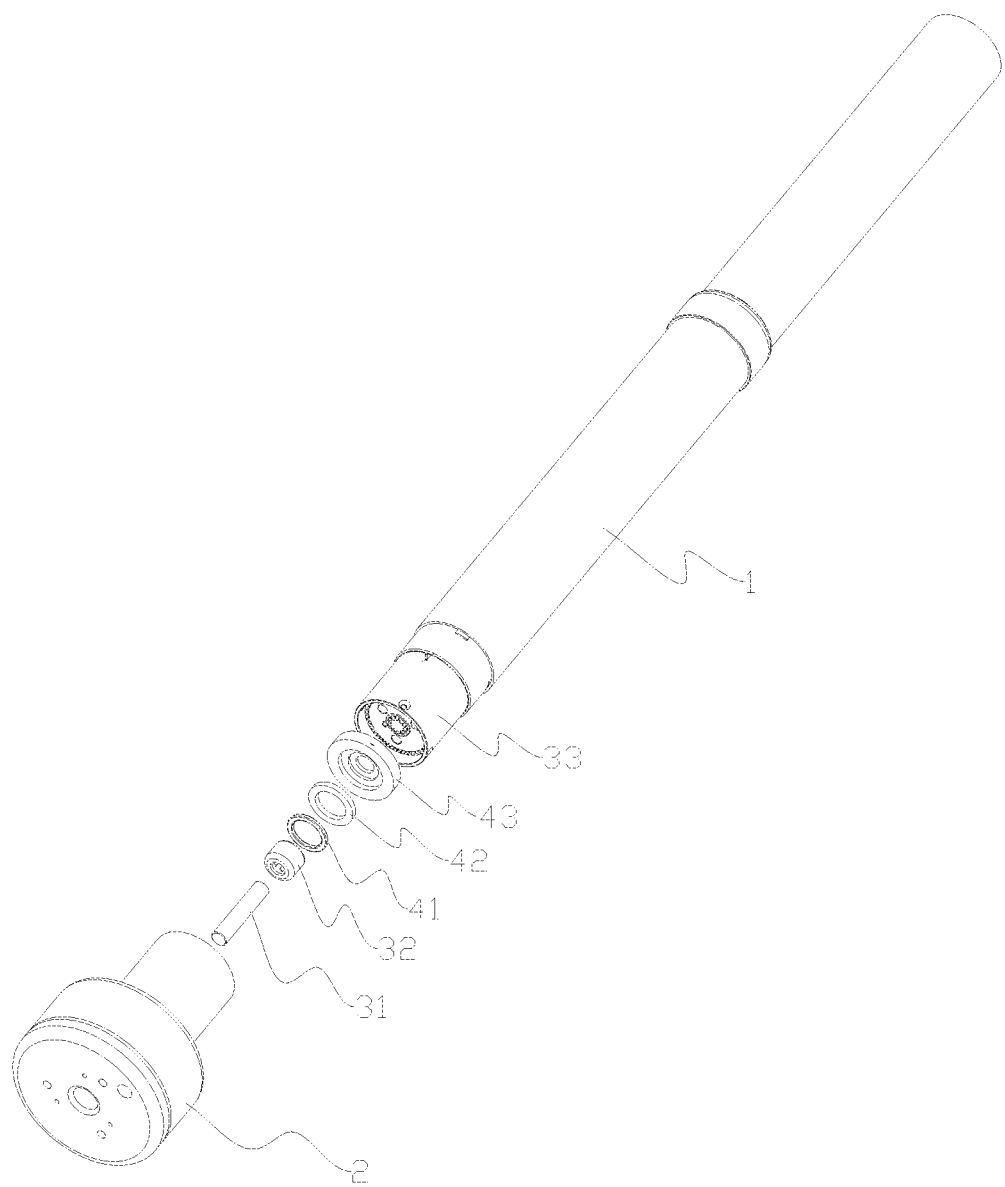
FIG. 2 is an assembling diagram of a lift mechanism self-locking push rod of the present disclosure.
Figure 3:
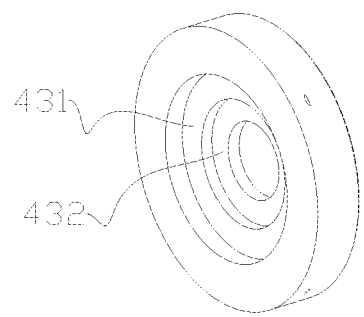
FIG. 3 is a schematic diagram illustrating a stereoscopic structure of a third locking piece in FIG. 2.
Figure 4:
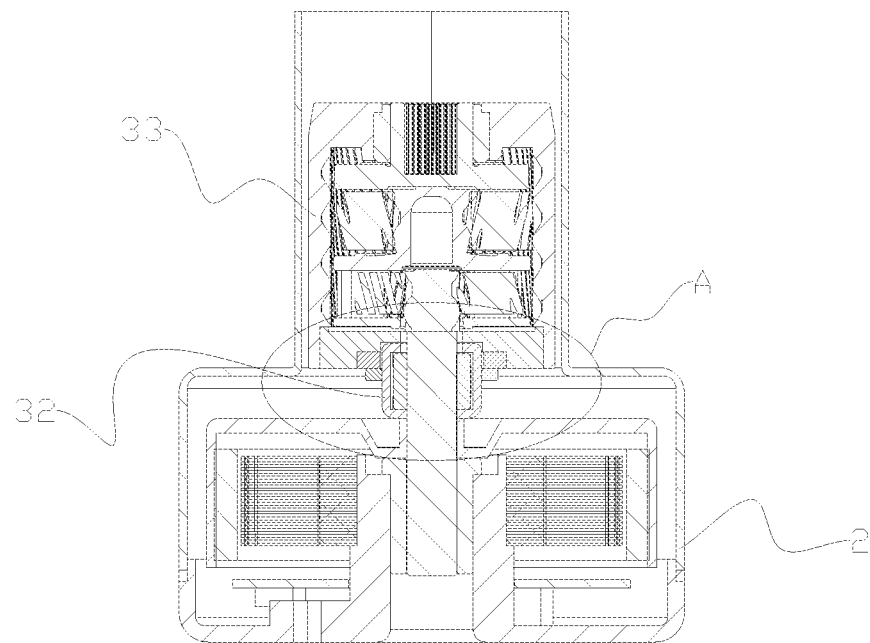
FIG. 4 is a schematic diagram illustrating an internal structure of a lift mechanism self-locking push rod of the present disclosure.
Figure 5:
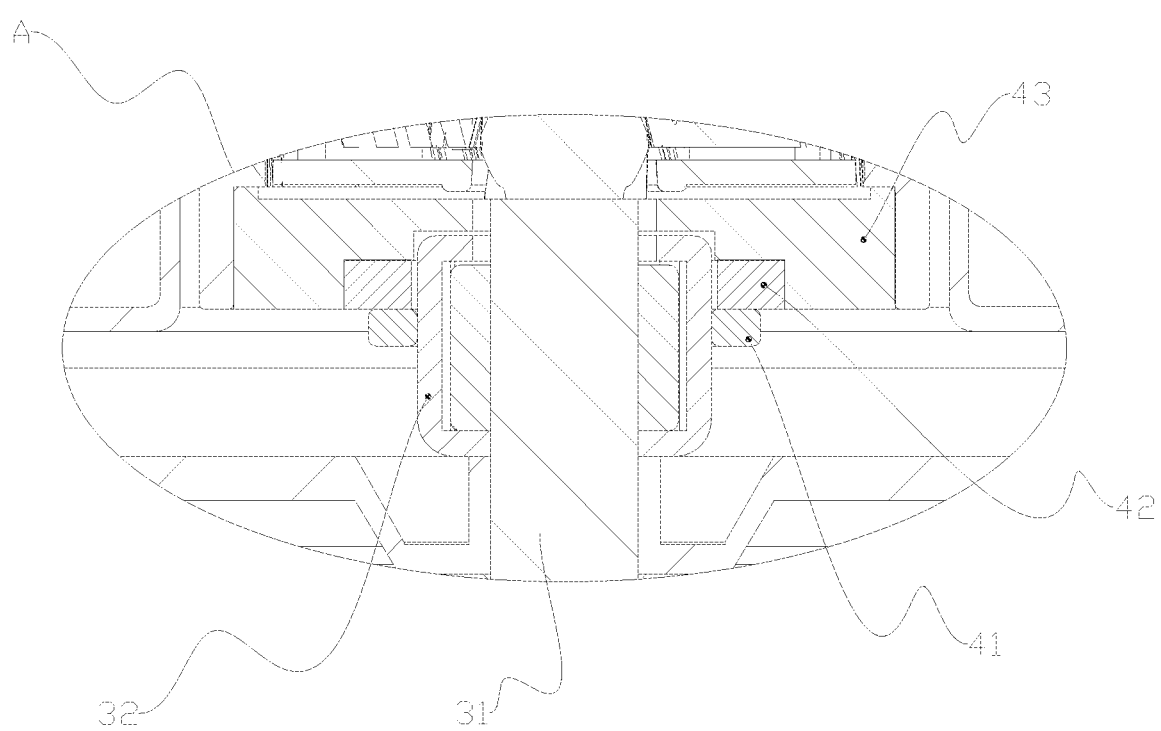
FIG. 5 is an enlarged schematic diagram of a region A in FIG. 4.

The present disclosure provides a lift mechanism self-locking push rod. FIG. 1 is a stereoscopic structure diagram of a lift mechanism. FIG. 2 is an assembling diagram of a lift mechanism self-locking push rod. FIG. 3 is a schematic diagram illustrating a stereoscopic structure of a third locking piece in FIG. 2. FIG. 4 is a schematic diagram illustrating an internal structure of a self-locking push rod. FIG. 5 is an enlarged schematic diagram of a region A in FIG. 4.

As shown in FIGS. 1 and 2, the lift mechanism self-locking push rod provided by the present disclosure mainly comprises: a drive component 2, a transmission component 3, and a lift component 1. A self-locking device is disposed on a path along which the drive component 2 transmits power to the transmission component 3. The transmission component 3 is provided with a power input shaft 31 used to receive a power from the drive component 2 and transmits the power to the lift component 1. The power input shaft 31 is sleeved into a one-way bearing 32. A first locking piece 41 and a second locking piece 42 are disposed around the one-way bearing 32. The first locking piece 41 is fixedly connected with the one-way bearing 32 and the second locking piece 42 rotatably cooperates with the one-way bearing 32. The first locking piece 41 is abutted against the second locking piece 42. There is a resistance between abutting surfaces of the first locking piece 41 and the second locking piece 42.

In practical applications, the drive component 2 starts to transmit a power and the power input shaft 31 receives the power. Since the power input shaft 31 is sleeved into the one-way bearing 32, the power input shaft 31 is rotated under the support of the one-way bearing 32 along a free rotation direction to transmit the power to a speed-varying assembly 33, and then the speed-varying assembly 33 performs rotation speed conversion, and then the power is further transmitted to the lift component 1. Thus, the lift component 1 is changed to a desired length. If the drive component 2 outputs a reverse power, the power input shaft 31 also receives the power. But, since the one-way bearing 32 is locked in this direction, the power input shaft 31 cannot rotate by the one-way bearing 32. Hence, the power input shaft 31, the one-way bearing 32 and the first locking piece 41 rotate entirely, and at this time, the drive component 2 has sufficient power to overcome a frictional force between the first locking piece 41 and the second locking piece 42. After the lift component 1 reaches a desired length, the power output of the drive component 2 is paused. At this time, the self-locking device locks the transmission component 2. Specifically, at this time, the lift component 1 transmits external acting forces such as weight to the transmission component 3. Because the one-way bearing 32 is locked in this direction and thus cannot rotate, the power input shaft 31, the one-way bearing 32 and the first locking piece 41 can serve as a one-piece structure. Further, the frictional force between the abutting surfaces of the first locking piece 41 and the second locking piece 42 is sufficient to counteract the external acting forces. Thus, the entire structure will not be rotated, namely, the length of the lift component 1 will not be changed, thus achieving the locking effect.

The resistance between the first locking piece 41 and the second locking piece 42 may be a frictional force, or a magnetic attraction force or both of them. In order to achieve the above purpose, a first solution is adopted: the abutting surfaces of the first locking piece 41 and the second locking piece 42 are made of a frictional material, or the first locking piece 41 and the second locking piece 42 are entirely made of a frictional material; or, a second solution is adopted: a magnetic attraction effect is present between the first locking piece 41 and the second locking piece 42, specifically, the first and second locking pieces 41 and 42 both are made of a magnetic material, or one of the first and second locking pieces 41 and 42 is made of a magnetic material and the other is made of a magnetically-attracted material; or, a third solution is adopted: the first solution and the second solution are combined, specifically, the first and second locking pieces 41 and 42 are made of a magnetic and frictional material, such that the first and second locking pieces 41 and 42 can provide a locking resistance by both a frictional force and a magnetic attraction force.

As a further improved embodiment, as shown in FIG. 2, the self-locking device is further provided with a third locking piece 43. The first locking piece 41, the second locking piece 42 and the third locking piece 43 are coaxially disposed and arranged sequentially along a drive force transmission direction. The first, second and third locking pieces 41, 42 and 43 are respectively provided with a shaft hole for the power input shaft 31 to pass through.

As a further improved embodiment, as shown in FIGS. 3, 4, and 5, a first step 431 and a second step 432 are disposed inside the third locking piece 43; a space above the first step 431 is used to accommodate the second locking piece 42, and the abutting surface of the second locking piece 42 is basically flush with a surface of the third locking piece 43 facing toward the drive component 2; and an end of the one-way bearing 32 is penetrated through the first locking piece 41 and the second locking piece 42 and then accommodated on the second step 432. With the disposal of the steps, the second locking piece 42 and the first locking piece 41 can be more easily squeezed to each other under the action of an external force, thus producing a larger resistance and helping the locking effect.

As a further improved embodiment, the third locking piece 43 is fixedly connected to the second locking piece 42, and the third locking piece 43 is located at an end of the transmission component 3 for receiving the power to buffer an axial vibration upon transmission of the drive force.

As a further improved embodiment, when the speed-varying assembly 33 is a gear speed-varying assembly, the gear speed-varying assembly comprises a drive gear, a driven gear and an external ring gear and the like. The power input shaft 31 sequentially passes through the shaft holes of the first locking piece 41, the second locking piece 42 and the third locking piece 43 and then connects with the drive gear. The drive force is transmitted through the power input shaft 31 to the drive gear, and the drive gear then drives the driven gear to transmit the power to a screw rod of the lift component, and thus, the lift component can be lengthened or shortened.

As a further improved embodiment, the first locking piece 41 and the second locking piece 42 both are annular structures, which are sequentially sleeved around the one-way bearing 32.

As a further improved embodiment, the power source of the drive component 2 may be an external rotor brushless motor, which can output larger power with lower noise and hence can be applied to height-adjustable desks or chairs and the like.

The materials, reagents and experimental apparatuses involved in the embodiments of the present disclosure all are commercially available products in the electric element field unless otherwise stated.

The above descriptions are merely made to preferred embodiments of the present disclosure. It should be pointed out that persons of ordinary skills in the prior arts can make improvements and modifications without departing from the core technology of the present disclosure. These improvements and modifications also shall fall within the scope of protection of the present disclosure. Any changes having the same or similar meanings as the claims of the present disclosure within the scope of protection of the claims shall fall within the scope of protection of the claims.

The invention claimed is:

1. A lift mechanism self-locking push rod, comprising: a drive component, a transmission component, and a lift component, wherein a self-locking device is disposed between the drive component and the transmission component; a power input shaft of the transmission component is sleeved into a one-way bearing; a first locking piece and a second locking piece are disposed around the one-way bearing; the first locking piece is fixedly connected with the one-way bearing, and the second locking piece rotatably cooperates with the one-way bearing; the first locking piece is abutted against the second locking piece; a resistance is generated between abutting surfaces of the first locking piece and the second locking piece for the purpose of locking,
    wherein the self-locking device is further provided with a third locking piece; the first locking piece, the second locking piece and the third locking piece are coaxially disposed and arranged sequentially along a drive force transmission direction; the first, second and third locking pieces are respectively provided with a shaft hole for the power input shaft to pass through, and
    wherein a first step and a second step are disposed inside the third locking piece; the first step is used to dispose the second locking piece; an end of the one-way bearing is penetrated through the first locking piece and the second locking piece and then accommodated on the second step.

2. The lift mechanism self-locking push rod of claim 1, wherein the resistance between the first locking piece and the second locking piece is one or two of a frictional force and a magnetic attraction force.

3. The lift mechanism self-locking push rod of claim 1, wherein at least the abutting surface of the first locking piece and the second locking piece are made of a frictional material.

4. The lift mechanism self-locking push rod of claim 1, wherein a magnetic attraction effect is present between the first locking piece and the second locking piece.

5. A lift mechanism self-locking push rod, comprising: a drive component, a transmission component, and a lift component, wherein a self-locking device is disposed between the drive component and the transmission component; a power input shaft of the transmission component is sleeved into a one-way bearing; a first locking piece and a second locking piece are disposed around the one-way bearing; the first locking piece is fixedly connected with the one-way bearing, and the second locking piece rotatably cooperates with the one-way bearing; the first locking piece is abutted against the second locking piece; a resistance is generated between abutting surfaces of the first locking piece and the second locking piece for the purpose of locking,
    wherein the self-locking device is further provided with a third locking piece; the first locking piece, the second locking piece and the third locking piece are coaxially disposed and arranged sequentially along a drive force transmission direction; the first, second and third locking pieces are respectively provided with a shaft hole for the power input shaft to pass through, and
    wherein the third locking piece is fixedly connected to the second locking piece, and the third locking piece is located at an end of the transmission component for receiving the power.

6. A lift mechanism self-locking push rod, comprising: a drive component, a transmission component, and a lift component, wherein a self-locking device is disposed between the drive component and the transmission component; a power input shaft of the transmission component is sleeved into a one-way bearing; a first locking piece and a second locking piece are disposed around the one-way bearing; the first locking piece is fixedly connected with the one-way bearing, and the second locking piece rotatably cooperates with the one-way bearing; the first locking piece is abutted against the second locking piece; a resistance is generated between abutting surfaces of the first locking piece and the second locking piece for the purpose of locking, wherein the self-locking device is further provided with a third locking piece; the first locking piece, the second locking piece and the third locking piece are coaxially disposed and arranged sequentially along a drive force transmission direction; the first, second and third locking pieces are respectively provided with a shaft hole for the power input shaft to pass through, and wherein when the power input shaft is operatively connected to transmit power to a gear speed-varying assembly, the power input shaft sequentially passes through the shaft holes of the first locking piece, the second locking piece and the third locking piece and then connects with a drive gear of the gear speed-varying assembly.

7. The lift mechanism self-locking push rod of claim 1, wherein the first locking piece and the second locking piece both are annular structures, which are sequentially sleeved around the one-way bearing.

8. The lift mechanism self-locking push rod of claim 1, wherein the drive component is provided with an external rotor brushless motor to provide the drive force.

\* \* \* \* \*